United States Patent
Halang

(10) Patent No.: US 7,097,029 B2
(45) Date of Patent: Aug. 29, 2006

(54) PARCEL GOODS ALIGNING DEVICE

(75) Inventor: Gerd Halang, Barbing (DE)

(73) Assignee: Krones AG., Neutraubling (DE)

( * ) Notice: Subject to any disclaimer, the term of this patent is extended or adjusted under 35 U.S.C. 154(b) by 0 days.

(21) Appl. No.: 11/024,054

(22) Filed: Dec. 23, 2004

(65) Prior Publication Data

US 2006/0151296 A1   Jul. 13, 2006

(51) Int. Cl.
*B65G 47/244* (2006.01)
*B65G 17/24* (2006.01)
(52) U.S. Cl. .............. 198/779; 198/395; 198/401; 198/622; 198/623; 198/624; 198/415
(58) Field of Classification Search .......... 198/395, 198/401, 622, 623, 624, 779, 415
See application file for complete search history.

(56) References Cited

U.S. PATENT DOCUMENTS

| 1,897,431 A | * | 2/1933 | Jones | 198/443 |
| 3,580,380 A | * | 5/1971 | Phillips | 198/376 |
| 4,901,842 A | * | 2/1990 | Lemboke et al. | 198/415 |
| 6,571,937 B1 | * | 6/2003 | Costanzo et al. | 198/779 |
| 6,625,953 B1 | * | 9/2003 | Smith et al. | 53/250 |
| 6,923,309 B1 | * | 8/2005 | Costanzo | 198/411 |
| 2004/0104100 A1 | * | 6/2004 | Schiesser et al. | 198/460.1 |

FOREIGN PATENT DOCUMENTS

| DE | 4205310 C2 | 8/1993 |
| DE | 10136870 A1 | 2/2003 |
| EP | 04789891 A1 | 4/1992 |
| EP | 0801289 A2 | 10/1997 |
| FR | 2637877 A1 | 4/1990 |
| IT | 01263500 A1 | 8/1996 |
| JP | 56158216 A | * | 12/1981 |

* cited by examiner

*Primary Examiner*—Gene O. Crawford
*Assistant Examiner*—Mark A. Deuble
(74) *Attorney, Agent, or Firm*—Marshall, Gerstein & Borun, LLP

(57) ABSTRACT

A device for aligning parcel goods, in particular bottle crates, boxes, trays or the like during conveyance, and having a conveyor device with a roller conveyor belt having two-part freely rotatable rollers, whereby the conveyance takes place in a plane of conveyance and the alignment takes place in an alignment area situated at least partially in the plane of transport, with a plurality of manipulation units that can be operated in a controlled manner and are situated above and/or below the roller chains in the alignment area. The manipulation units are able to alter the speed and/or the direction of rotation of the rollers for rotation of a parcel about an axis perpendicular to the plane of transport, with at least one preferably optical recognition device which detects the aligned position of the parcel and a control device which controls the process of alignment of the parcel.

14 Claims, 3 Drawing Sheets

PARCEL GOODS ALIGNING DEVICE

FIELD OF THE INVENTION

The invention relates to a device for aligning parcel goods, in particular bottle crates, cardboard boxes, trays or the like.

BACKGROUND OF THE DISCLOSURE

For example, in beverage bottling lines for returnable bottles, special devices may be provided in an area upstream from a bottle unpacking machine to, if necessary, cause the bottle crates arriving from a depalletizing machine to be rotated about their vertical axis into the alignment position required for the unpacking machine. In the case of bottle crates having a symmetrical design of the compartments, i.e., a symmetrical arrangement of the bottles in the crate, as a rule one need only ensure that the bottle crates are supplied to the unpacking machine with them all aligned with their longitudinal extent either across or along the direction of conveyance. If the packing head of the unpacking machine is designed so that, for example, only bottles from bottle crates arriving from the depalletizing machine in the longitudinal position, said crates being conveyed in the transverse position, can be removed are rotated by 90 degrees with respect to their vertical axis into the required transverse position, said rotation being accomplished by an integrated crate rotating device which can be driven into the conveyance position.

In addition, such a device for aligning parcel goods may also be accommodated in a packaging line in which the items to be packaged are stacked on pallets with a certain pattern of positions. In palleting articles, at least the longitudinal and/or transverse alignment of the parcel goods must be taken into account, which is why a rotation by at least 90 degrees is necessary. In many application cases, however, the alignment of certain features of the parcel goods in certain directions is important, e.g., it is often necessary to align the labeling on the parcel goods so that it faces outward in the pallet stack and is legible. Thus, for example, a rotation by 180 or 270 degrees is necessary, or to achieve shorter angles of rotation, a rotation by −90 degrees may also be necessary. If the incoming parcel goods are not already aligned, continuous rotation to achieve the correct alignment may also be necessary.

SUMMARY OF THE DISCLOSURE

Therefore, the object of the present disclosure is to provide a device which will align the parcel goods on the basis of certain features. In addition, the object of the present disclosure is to control the alignment process with the greatest possible precision.

The disclosed device is preferably suitable for aligning parcel goods, whereby the parcel goods are advantageously aligned during their conveyance. It is also conceivable to perform the alignment while the conveyor is at a standstill. The alignment of the parcel goods may be performed with either a positive or a negative direction of rotation, but the rotation is preferably continuous without any steps. According to a preferred embodiment of this invention, the parcel goods are sent in directional alignment to the alignment device so that in the case of rectangular parcel goods, for example, a rotation by −90 degrees, 90 degrees, 180 degrees or 270 degrees is preferably performed.

The conveyance system preferably consists of a roller conveyor belt having freely rotating rollers which are divided into two parts, the division of the rollers with respect to the width of the roller conveyor belt preferably performed in the middle. The alignment area, which is thus at least partially in the plane of conveyance, is characterized in that manipulation units are provided there for controlling the speed and/or direction of rotation of the rollers. The parcel goods are preferably conveyed on the conveyance device in such a way that their center of gravity is as low as possible.

In another embodiment of the disclosed device, a manipulation unit acts on multiple rollers, whereby the length of the contact surface with the rollers is preferably smaller than the length or the width of the parcel goods to be aligned.

In a preferred embodiment, a separate manipulation unit is arranged in the alignment area of each roller of the roller conveyor belt. Due to this arrangement, a very precise alignment of the parcel goods on the conveyor device can be achieved. In another preferred embodiment, the manipulation units are controllable pressure elements which may come in friction-locking contact with the rollers of the roller conveyor belt. However, any other influence on the direction of rotation and/or the speed of the rollers, e.g., due to a magnetic force action, is also conceivable.

The pressure elements are preferably designed so that they can be driven by an acting unit such as a pneumatic cylinder. The triggering is preferably accomplished in a controlled manner so that the pressure elements can be brought into fixed engagement with the rollers to varying extents, so that here again, it is possible to influence the speed of rotation and the accuracy of rotation. It is self-evident that other operative units such as electromagnets may be used to drive the pressure elements.

According to an especially preferred embodiment, the pressure elements can be driven in a pulsating manner. If the pressure elements are triggered in a pulsating manner, preferably at the inlet and/or at the outlet for the parcel goods, the result us a very gentle onset of rotation and/or a gentle end of rotation because the pressure elements do not abruptly accelerate or decelerate the rollers.

The manipulation units are preferably arranged so that they are accommodated only at the left or only at the right, or instead they may be mounted only at the top and bottom. In an especially preferred embodiment, the manipulation units are mounted at the top of the one side of the roller conveyor belt and at the bottom on the other end. Due to this arrangement, it is possible to achieve a particularly rapid rotation of the parcel goods with the lowest possible cost of materials because the rollers of the roller conveyor belt are accelerated on one end by the manipulation unit and on the other end they are slowed down and/or brought to a stop.

In another preferred embodiment of this invention, the manipulation units are at the top and bottom and at the right and left of the roller conveyor belt to permit an extremely rapid and flexible alignment of the parcel goods in any direction of rotation.

It is also possible for the manipulation units to be designed as drivable belts with a speed that is preferably continuously variable. However, there may also be multiple belts whose speed can be adjusted independently of one another to allow more precise control of the rotational process. A belt of this type can preferably be brought to engagement with the rollers carrying the parcel to be rotated and can be brought to engagement in a controlled manner by way of pressure elements that can be operated in a controlled manner, e.g., with a sliding pad that can be entrained in synchronization with the parcel goods along the direction of conveyance or with a row of pressure elements which are arranged in stationary position along the direction of conveyance and can be driven, preferably individually, in synchronization with the conveyance speed.

Preferably the manipulation units are mounted in such a way that they cannot be moved with respect to the direction of conveyance, i.e., they are stationary. However, it is also conceivable for the manipulation units to be able to move in and against the direction of conveyance and/or to be movable in a controlled fashion so that one manipulation unit may be reasonable for manipulation of multiple rollers. This embodiment allows a more precise influence on the rotational acceleration and also allows a greater rotational speed on the whole.

According to another embodiment of this disclosure invention, the manipulation units are designed as pressure strips which can act preferably on multiple rollers. These strips can be conceived as both stationary and as movable in or against the direction of conveyance. Preferably several short pressure strips are arranged one after the other along the alignment area, the length of these pressure strips preferably being smaller than the length or the width of the parcel goods and/or preferably shorter than ten centimeters.

To be able to recognize the alignment of the parcel goods supplied to the parcel goods rotating device, recognition devices are provided on or near the roller conveyor belt. These devices are formed, preferably, by optical recognition equipment, preferably involving beams of light and/or at least one camera. The alignment of the parcel goods may also be detected by ultrasound. This recognition equipment permits automatic recognition of the alignment and correction of the alignment and/or the rotational position of the parcel goods.

If beams of light are used in one embodiment, this is preferably in the form of a light barrier unit which has at least two light emitters and at least two light receivers. The light barrier units are preferably set up so that their beams of light can travel from one side to the other side of the roller conveyor belt across the direction of conveyance. A control device is able to generate the dimensions and/or the instantaneous alignment of the parcel goods and, if necessary, also detect their speed of conveyance on the basis of the signals generated by the interruption in the beams of light. In a preferred embodiment, however, not just two beams of light are used but instead an entire row of beams of light, i.e., a light curtain is formed. This may be accomplished, e.g., via two parallel light strips arranged one above the other, one being a light transmitting unit and the other being a light receiving unit. Due to the arrangement of multiple light emitters in close proximity to one another, this provides very accurate information about the current rotational position and the instantaneous position of the parcel goods along the direction of conveyance. This information is made available to the control unit to make it possible to achieve the most accurate possible alignment of the parcel goods. The length of the light curtain preferably amounts to a multiple of the parcel goods length, preferably at least 2.5 meters.

The light emitter is preferably arranged so that the beams move parallel to the plane of transport and across the direction of conveyance in a plane beneath the level of the parcel goods. In a preferred refinement of this invention, a dense curtain of light is formed by the radiation source, with the parcel goods traversing through it during the alignment operation. The distance between two adjacent beams of light preferably amounts to less than five centimeters, especially preferably less than two centimeters, because a very precise determination with a high resolution can be achieved in this way.

According to a preferred refinement of this disclosure, the light emitters are lasers and/or the beams of light are laser beams.

In another embodiment of the disclosed device, a camera, preferably a CCD camera, is used as the optical recognition device, so that certain optical features such as labeling on the parcel goods or carrying equipment can also be detected and used for the alignment. This at least one camera may be situated above the alignment area above the path of conveyance of the parcel goods, for example. It is also conceivable to mount multiple cameras preferably above the alignment area along the direction of conveyance F because the rotational process can be monitored accurately accordingly by analyzing the images.

In a preferred embodiment, the two optical recognition devices described here, namely the at least one CCD camera and the light curtain, may be combined to be able to achieved the most accurate possible alignment. In proximity to or on the parcel goods rotating device, preferably a control unit such as a programmable controller system is mounted, receiving various signals, processing them and/or analyzing them and generating commands from them, said commands being relayed to executing units. The control unit receives, among other things, signals from the optical recognition devices and signals regarding the speed and position of the roller conveyor belt, and it processes these signals and from them generates a signal that controls the manipulation units to obtain the fastest and most optimum possible rotational movement. The signal for the position and speed of the roller conveyor belt is preferably conveyed by a rotary position transducer to the control unit.

The commands of the control unit are relayed to the executing units by cable. The cable-bound solution can be implemented with data cables or with bus systems such as a CAN bus or a Profibus.

According to one refinement of this disclosed, the control device receives signals wirelessly, processes them and also issues the resulting commands by wireless transmission to the executing units. Such a wireless solution may be implemented, e.g., with microwave, Bluetooth or infrared devices.

BRIEF DESCRIPTION OF THE DRAWINGS

An exemplary embodiment of this disclosed is described in greater detail on the basis of the following drawings, in which.

DETAILED DESCRIPTION OF THE DISCLOSURE

Figure 1:
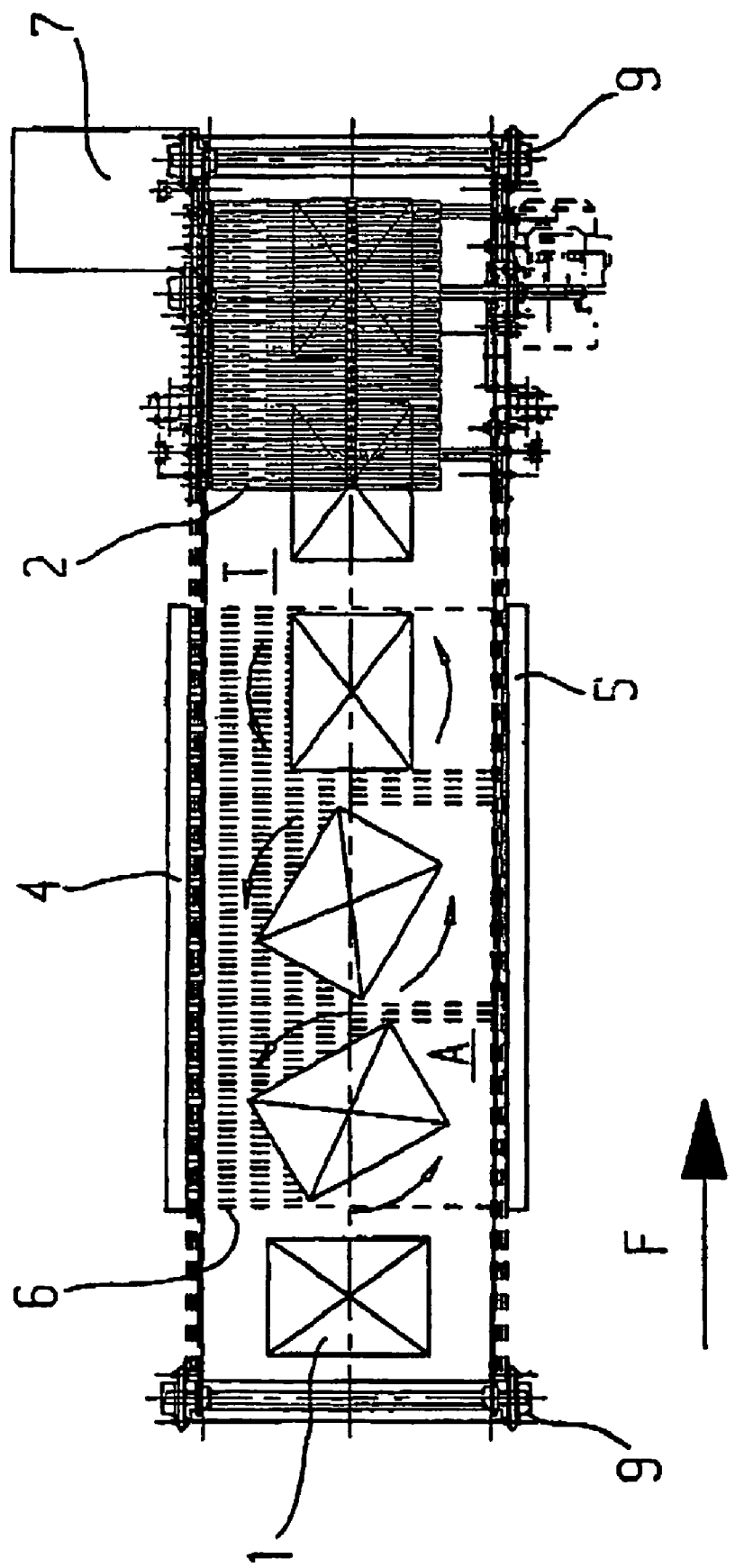
FIG. 1 shows a top view of a parcel goods rotating device

FIG. 1 shows a parcel 1, which is rotated counterclockwise in its conveyance in the direction of conveyance F from the left side of the figure to the right side of the figure and in doing so is aligned. The parcel 1 travels in the horizontal plane of transport T on rollers 2, which are shown only partially in this figure for the sake of simplicity. The alignment of the parcel goods 1 takes place in the alignment area A. The continuously revolving roller conveyor belt is designed so that the tension means (roller chain) are guided on the right and left. Crossbars are mounted on the tension means with rollers 2 mounted on them so they can rotate freely. The rollers 2 are approximately half as long as the crossbars.

The rollers 2 are mounted on deflections 9 out of and/or into the plane of transport T. At the end of the rotating and conveyance process, the roller conveyor belt is brought into a plane parallel to and beneath the plane of transport T at the downstream deflection 9 for the purpose of returning from the plane of transport T into a plane parallel to and beneath the plane of transport T. The roller conveyor belt returned in this way is again deflected at the upstream deflection 9 at the beginning of the conveyance of the parcel goods and thus is brought from the return plane which is beneath the plane of transport T into the plane of transport T.

On the left hand of the parcel goods 1 to be aligned, as seen in the direction of conveyance F, there is a light transmitting strip 4, whereas on the opposite side to the right there is a parallel light receiving strip 5. The light transmitting strip 4 has a plurality of light emitters arranged at regular intervals, the light emitted by them being received by corresponding light receivers on the opposite side incorporated into the light receiving strip 5. The stationary light transmitter strip 4 and the light receiving strip 5 are mounted so that the radiation emitted by the light transmitter strip 4 is in a parallel plane above the plane of transport T. The distance of the light transmitter strip 4 from the plane of transport T is selected so that the parcel goods 1 are moved by the beams of light 6 in their conveyance on the parcel goods aligning device and so that it causes a local interruption in the beams of light assigned to the instantaneous location of the particular parcel.

The length of the light transmitting and/or light receiving strips 4 and 5 corresponds essentially to the length of the alignment area A and amounts to a multiple, e.g., three times the length of the parcel goods. The length of the alignment area A is determined by the number of manipulation units 3 (not shown here for the sake simplicity) and the maximum parcel goods length.

If one parcel 1 is situated completely in the light curtain formed by the light transmitter strip 4, then the control unit 7 connected to the light receiving strip 5 recognizes current rotational position of the parcel goods during the conveyance movement on the basis of the received light beams 6 and the light beams that are shadowed and/or concealed by the parcel goods. If there is to be rotation of the parcel goods 1, this is initiated by actuation of the manipulation units 3. As long as the parcel goods 1 are in the light curtain, the rotational position can be monitored continuously on the basis of the number of concealed beams of light and the rotational process can thus be controlled in a targeted manner.

The manipulation units form pressure fingers which consist of a pneumatic cylinder 10, a swivel lever and a friction pad. On actuation of the pneumatic cylinder 10, the swivel lever is moved so that the friction pad comes into frictional contact with the roller 2 and the latter is accelerated or decelerated, depending on whether the friction pad acts on the roller 2 from above or below. The manipulation units 3 are arranged in the manner of a piano keyboard in a row along the path of travel of the rollers 2.

Figure 2:
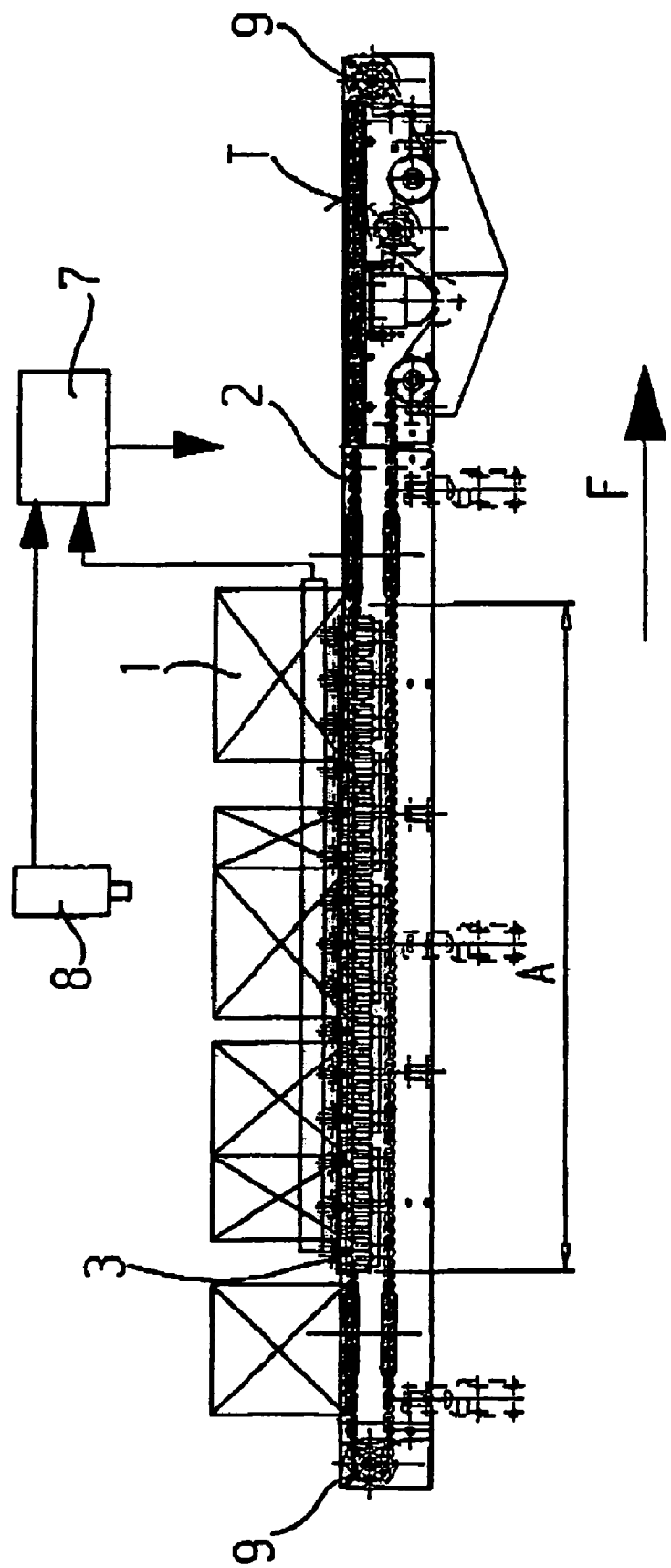
FIG. 2 shows a side view of the inventive device.

FIG. 2 shows an embodiment of a parcel goods aligning device, which corresponds essentially to the exemplary embodiment according to FIG. 1 in terms of the mechanical structure. The only difference is the camera 8 which is used in addition to the position recognition of the parcel goods 1, the camera being positioned above the aligning area over the parcel goods 1 to be aligned. This camera has an intelligent real time image analysis function. It also allows the alignment of circular objects on the basis of optical markings or print images. Here again, there is a continuous roller conveyor belt consisting of rollers 2, said conveyor belt being brought out of and into the plane of transport T at the respective deflections 9. The manipulation units 3, which were described above and which perform the acceleration and/or retardation of the rollers 2 and thus the rotation of the parcel goods 1 through controlled frictionally locking engagement, are situated in the alignment area A. To this end, the pneumatic cylinders 10 can be driven either individually and/or in groups by the control unit 7 as a function of the rotational position thus detected in order to bring the friction pads into engagement with the rollers 2.

Figure 3:
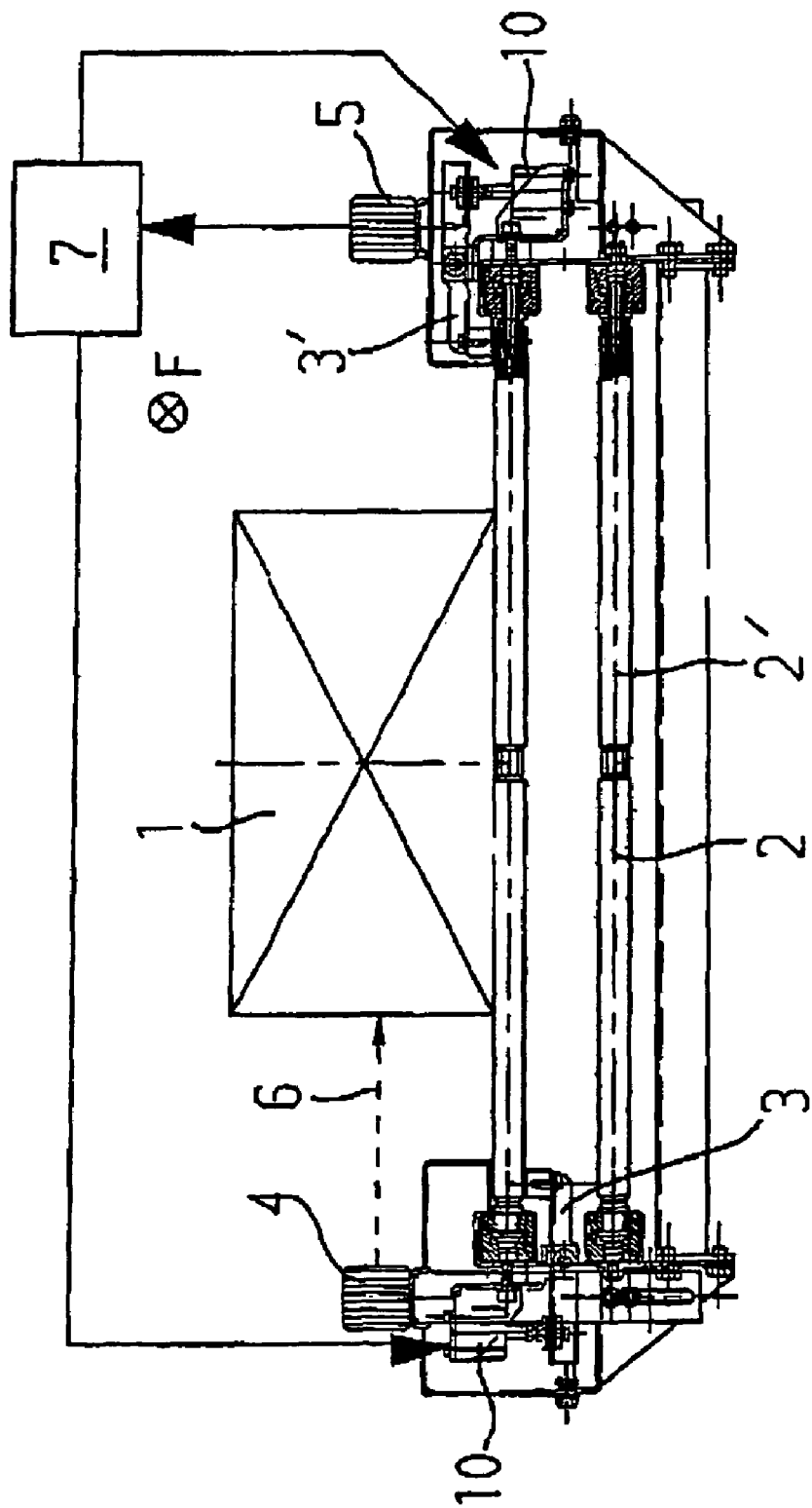
FIG. 3 shows a front view of an inventive device

For the sake of better illustration, the right and left rollers (2, 2') and the manipulation units (3, 3') are differentiated in FIG. 3. In FIG. 3, the parcel goods 1 to be aligned are already approximately at the center above the rollers 2, 2' in the alignment area A. The recognizable beam of light 6 which is transmitted from the light transmitter strip 4 across, i.e., at a right angle to the direction of conveyance F in parallel with the plane of transport T in the direction of the light receiving strip 5 is already interrupted by the parcel goods 1. The number of interrupted beams of light 6 is a measure of the instantaneous rotational position of the parcel goods 1 having a noncircular perpendicular projection area.

The manipulation units 3 are located on the side of the light transmitter strip 4 beneath the rollers 2 which form the upper strand of the roller conveyor belt. These are designed as pressure fingers which exert a pressure on the rollers 2 when activated. This pressure from beneath on the rollers 2 running on the left side increases the speed of conveyance of the parcel goods 1 by the amount of the circumferential speed of the rollers 2. This is true when the parcel goods 1 are being transported in the direction of conveyance F indicated in the figure.

Stationary manipulation units 3' which exert a pressure from above on the rollers 2' when operated are situated on the side of the light receiving strip 5 in the alignment area above the rollers 2' of the upper strand running on the right side. This pressure from above stops the rollers 2' which are moving at a circumferential speed along the direction of conveyance F so that their circumferential speed is equal to zero. This difference in the circumferential speeds of the opposing rollers (2, 2') causes the rotational process of the parcel goods 1 to be completed.

What is claimed is:

1. Device for aligning parcel goods (1) being conveyed, comprising a conveyor device consisting of a roller conveyor belt having two-part freely rotating rollers (2, 2') adapted to convey the articles in a plane of transport (T) and with alignment accomplished in an alignment area (A) which is located at least partially in the plane of transport (T), a plurality of manipulation units (3, 3') operated in a controlled manner being situated one of above and beneath the rollers (2, 2'), the manipulation units adapted to vary one of the speed and direction of rotation of the rollers (2, 2') for rotating a parcel (1) about an axis perpendicular to the plane of transport (T), at least one recognition device adapted to detect the aligned position of the parcel goods (1), and a control unit (7) adapted to the alignment process of the parcel goods (1), wherein the alignment area (A) each roller (2, 2') of the roller conveyor belt is assigned its own manipulation unit (3, 3').

2. Device according to claim 1 wherein the roller conveyor belt is a continuously revolving roller conveyor belt.

3. Device according to claim 1, wherein the manipulation units (3, 3') act on the rollers (2, 2') supporting the parcel goods on the one side of the roller conveyor belt while on the other side of the roller conveyor belt they act on the rollers (2, 2') from the bottom in the alignment area(A).

4. Device according to claim 1, wherein the manipulation units (3, 3') are controllable pressure elements which cause a change in one of the speed and direction of rotation of the rollers (2, 2') through frictionally contact.

5. Device according to claim 1, wherein the manipulation units (3, 3') are situated in the alignment area (A) at one of the left along the conveyor belt, the right along the conveyor belt, above the rollers (2, 2'), and below the rollers (2, 2') carrying the parcel goods (1).

6. Device according to claim 1, wherein the manipulation units (3, 3') are mounted immovably with respect to a direction of conveyance (F).

7. Device according to claim 1, wherein the recognition device is an optical recognition device.

8. Device according to claim 7, wherein the control unit (7) uses the information of the optical recognition device regarding the position of the parcel (1) to be aligned in order to one of activate and deactivate the manipulation units (3, 3') in a targeted manner and thereby align the parcel (1).

9. Device according to claim 7, wherein the at least one optical recognition device includes at least two beams of light which are directed across the direction of conveyance (F) from the one side of the roller conveyor belt and received on the other side of the roller conveyor belt.

10. Device according to claim 7, wherein the at least one optical recognition device is a light transmitting strip (4) and with a light receiving strip (5) arranged opposite the light transmitting strip (4), with the emitted or received radiation running parallel to the plane of transport (T) at the level such that the parcel (1) to be aligned moves through the radiation in its conveyance along the direction of conveyance (F).

11. Device according to claim 10, wherein the light transmitter strip (4) has a plurality of light emitters whose distance from one another is smaller than the length or width of the parcel (1) to be aligned.

12. Device according to claim 7, wherein the at least one optical recognition device is a camera (8).

13. Device for aligning parcel goods (1) being conveyed, comprising a conveyor device consisting of a roller conveyor belt having two-part freely rotating rollers (2, 2') adapted to convey the articles in a plane of transport (T) and with alignment accomplished in an alignment area (A) which is located at least partially in the plane of transport (T), a plurality of manipulation units (3, 3') operated in a controlled manner being situated one of above and beneath the rollers (2, 2'), the manipulation units adapted to vary one of the speed and direction of rotation of the rollers (2, 2') for rotating a parcel (1) about an axis perpendicular to the plane of transport (T), at least one recognition device adapted to detect the aligned position of the parcel goods (1), and a control unit (7) adapted to the alignment process of the parcel goods (1), wherein the manipulation units (3, 3')is arranged so that it can move the conveyor device one of in and opposite the direction of the conveyance (F).

14. Device, for aligning parcel goods (1) being conveyed, comprising a conveyor device consisting of a roller conveyor belt having two-part freely rotating rollers (2, 2') adapted to convey the articles in a plane of transport (T) and with alignment accomplished in an alignment area (A) which is located at least partially in the plane of transport (T), a plurality of manipulation units (3, 3') operated in a controlled manner being situated one of above and beneath the rollers (2, 2'), the manipulation units adapted to vary one of the speed and direction of rotation of the rollers (2, 2') for rotating a parcel (1) about an axis perpendicular to the plane of transport (T), at least one recognition device adapted to detect the aligned position of the parcel goods (1), and a control unit (7) adapted to the alignment process of the parcel goods (1), wherein the manipulation units (3, 3') are spaced relative to an adjacent manipulation unit (3, 3') such the parcel goods (1) overlaps a midpoint of a contact surface of the manipulation unit (3, 3') and a midpoint of the contact surface of another adjacent manipulation unit (3, 3'). direction of conveyance (F).

* * * * *

UNITED STATES PATENT AND TRADEMARK OFFICE
CERTIFICATE OF CORRECTION

PATENT NO. : 7,097,029 B2
APPLICATION NO. : 11/024054
DATED : August 29, 2006
INVENTOR(S) : Gerd Halang It is certified that error appears in the above-identified patent and that said Letters Patent is hereby corrected as shown below:

Column 8, Claim 13, Line 15, delete " the manipulation units " and insert -- at least one manipulation unit --.

Column 8, Claim 13, Line 17, delete "the" before "conveyance (F)".

Column 8, Claim 14, Line 37-38, delete "direction of conveyance (F)".

Signed and Sealed this

Twenty-seventh Day of February, 2007

JON W. DUDAS
*Director of the United States Patent and Trademark Office*